United States Patent
Le et al.

(10) Patent No.: US 10,959,168 B2
(45) Date of Patent: *Mar. 23, 2021

(54) COLLABORATIVE SCHEME FOR SELECTION OF OPTIMAL ACCESSES AND SEAMLESS TRANSITION BETWEEN ACCESSES

(71) Applicant: BlackBerry Limited, Waterloo (CA)

(72) Inventors: Khiem Le, Coppell, TX (US); Wei Wu, San Jose, CA (US); Wing Fai Lo, Plano, TX (US)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,762

(22) Filed: Feb. 11, 2019

(65) Prior Publication Data

US 2019/0174404 A1     Jun. 6, 2019

Related U.S. Application Data

(63) Continuation of application No. 13/822,695, filed as application No. PCT/US2011/038537 on May 31, 2011, now Pat. No. 10,206,164.

(51) Int. Cl.
   *H04W 48/18* (2009.01)
   *H04W 24/08* (2009.01)
   (Continued)

(52) U.S. Cl.
   CPC ........... *H04W 48/18* (2013.01); *H04W 24/08* (2013.01); *H04W 48/14* (2013.01); *H04W 64/00* (2013.01)

(58) Field of Classification Search
   CPC ..... H04W 48/18; H04W 24/08; H04W 48/14; H04W 64/00
   See application file for complete search history.

(56) References Cited

U.S. PATENT DOCUMENTS 7,171,218 B2   1/2007 Ikeda et al.
8,185,152 B1*  5/2012 Goldner ............... H04W 48/18
                                              455/552.1

(Continued)

FOREIGN PATENT DOCUMENTS

CN    1541022 A    10/2004
EP    1021055 A2    7/2000
(Continued)

OTHER PUBLICATIONS

Office Action dated Jan. 13, 2016; U.S. Appl. No. 13/822,695, filed Jun. 4, 2013; 26 pages.

(Continued)

*Primary Examiner* — Marcus Hammonds
(74) *Attorney, Agent, or Firm* — Conley Rose, P.C.; J. Robert Brown, Jr.; Gayatry S. Nair

(57) ABSTRACT

Devices and methods are disclosed for selecting an optimal access network in a wireless communications environment, such as when offloading mobile data traffic. In various embodiments disclosed herein, a contributing device comprises processing logic configured to generate a set of communication environment identification data corresponding to the location of the communication device, to generate a set of observed AN availability and communication performance data corresponding to the location of the communication device, and to transmit the set of communication environment identification data and the set of observed communication performance data to a server. In some embodiments, the contributing device is location-aware and in some embodiments, the contributing device is location-unaware.

21 Claims, 8 Drawing Sheets

(51) Int. Cl.
*H04W 48/14* (2009.01)
*H04W 64/00* (2009.01)

(56) References Cited

U.S. PATENT DOCUMENTS

| | | | |
|---|---|---|---|
| 10,206,164 B2 | 2/2019 | Le et al. | |
| 2004/0185850 A1 | 9/2004 | Ikeda et al. | |
| 2006/0068809 A1 | 3/2006 | Wengler et al. | |
| 2010/0003980 A1 | 1/2010 | Rune et al. | |
| 2012/0314571 A1* | 12/2012 | Forssell | H04L 63/10 370/230 |
| 2013/0288704 A1* | 10/2013 | Wirola | G01S 5/14 455/456.1 |

FOREIGN PATENT DOCUMENTS

| | | | |
|---|---|---|---|
| EP | 1313270 A2 | 5/2003 | |
| EP | 1460873 A1 | 9/2004 | |
| EP | 1662836 A2 | 5/2006 | |
| WO | 2011058395 A1 | 5/2011 | |

OTHER PUBLICATIONS

Final Office Action dated Aug. 10, 2016; U.S. Appl. No. 13/822,695, filed Jun. 4, 2013; 21 pages.
Advisory Action dated Oct. 25, 2016; U.S. Appl. No. 13/822,695, filed Jun. 4, 2013; 3 pages.
Office Action dated Dec. 2, 2016; U.S. Appl. No. 13/822,695, filed Jun. 4, 2013; 22 pages.
Final Office Action dated Jun. 16, 2017; U.S. Appl. No. 13/822,695, filed Jun. 4, 2013; 20 pages.
Advisory Action dated Aug. 25, 2017; U.S. Appl. No. 13/822,695, filed Jun. 4, 2013; 3 pages.
Advisory Action dated Sep. 29, 2017; U.S. Appl. No. 13/822,695, filed Jun. 4, 2013; 4 pages.
Notice of Allowance dated May 17, 2018; U.S. Appl. No. 13/822,695, filed Jun. 4, 2013; 8 pages.
Notice of Allowance dated Sep. 24, 2018; U.S. Appl. No. 13/822,695, filed Jun. 4, 2013; 8 pages.
PCT International Search Report; Application No. PCT/US2011/038537; dated Mar. 16, 2012; 6 pages.
PCT Written Opinion of the International Searching Authority; PCT/US2011/038537; dated Mar. 16, 2012; 11 pages.
Canadian Office Action; Application No. 2,837,377; dated Sep. 13, 2016; 4 pages.
Canadian Office Action; Application No. 2,837,377; dated Apr. 12, 2017; 4 pages.
Canadian Office Action; Application No. 2,837,377; dated Mar. 2, 2018; 3 pages.
Chinese Office Action; Application No. 201180071312.6; dated Apr. 25, 2016; 15 pages.
Chinese Office Action; Application No. 201180071312.6; dated Nov. 17, 2016; 9 pages.
European Examination Report; Application No. 11726009.1; dated Jan. 19, 2015; 8 pages.

\* cited by examiner

COLLABORATIVE SCHEME FOR SELECTION OF OPTIMAL ACCESSES AND SEAMLESS TRANSITION BETWEEN ACCESSES

CROSS-REFERENCE TO RELATED APPLICATIONS

This application is a continuation of U.S. patent application Ser. No. 13/822,695 filed Jun. 4, 2013 by Khiem Le, et al. entitled, "Collaborative Scheme for Selection of Optimal Accesses and Seamless Transition Between Access", which is a U.S. National Stage of International Application No. PCT/US2011/038537 filed May 31, 2011 entitled, "Collaborative Scheme for Selection of Optimal Accesses and Seamless Transition Between Access", both of which are incorporated by reference herein as if reproduced in their entirety.

BACKGROUND

The use of mobile devices for data applications has become increasingly popular in recent years. This popularity has led to a corresponding increase in mobile data traffic, which is projected to grow 39-fold from 2009 to 2014. Such growth has created the demand for additional network capacity, motivating network operators to acquire new licensed spectrum. At the same time, it has strained existing mobile networks, necessitating upgrades to their associated access, transport and backhaul infrastructures. Offsetting the costs of these upgrades by increasing revenues from higher traffic volume presents other challenges due to the operator's cost structure and their current charging model for data applications. As a result, operators are driven to adopt new paradigms to decrease their per-byte data costs. One such approach, which is currently attractive to operators, is to offload their mobile data traffic to alternative access networks. Taking this approach assists in mitigating the need of costly radio access and backhaul network upgrades while simultaneously alleviating usage loads on licensed spectrum.

To fully realize the benefits of offloading, the mobile device should either switch to a more optimal access method when it becomes available during a communication session, or alternatively, select the most optimal access method available when initiating a new session. More advanced approaches involve the simultaneous use of multiple access technologies and methods to achieve a more seamless transition between accesses, increase throughput, and improve performance metrics through path diversity. Alternative access network technologies for offloading include Wireless Fidelity (WiFi), based on the IEEE 802.11x standards, which is capable of providing high throughput (e.g., hundreds of Mbps with 802.11n). One current example of using WiFi for offloading mobile data traffic from cellular networks is the 3rd Generation Partnership Project (3GPP). However, 3GPP does not specify all of the steps needed to achieve a seamless heterogeneous, or vertical, handoff between cellular and Wi-Fi.

Another approach is based on collaboration among mobile devices. In this approach, the mobile device discovers what access options are available, determines whether they would provide sufficient performance for the application, and then selects the best one. To do so, the mobile device queries other mobile devices for a variety of information, which it then uses as decision criteria to select an access node (AN) that will provide the best throughput performance. As an example, the information received from the mobile devices may include the received signal strength (RSS) of various ANs. However, an AN's RSS, by itself, may not guarantee that a given AN will provide the best throughput performance, as the throughput performance typically depends on other factors such as interference levels and traffic loads on the AN and its supporting backhaul network. Additionally, the performance metric could be based on other considerations than throughput alone. For example, the performance metric could be based on delay, loss rates, power consumption, etc.

Additionally, certain applications require a short handoff break. But prior to measuring an AN's RSS, the device has to perform scanning operations to discover what ANs are available, which may cause excessive handoff delays. As a result, 3GPP has defined the Access Network Discovery and Selection Function (ANDSF) to help speed up the discovery of available ANs by providing the mobile device with a list of available access. However, the ANDSF database has to be managed by the operator to keep it up to date, which is labor intensive. Furthermore, the ANDSF database can only include ANs known to the network operator. As a result, the mobile device may perform all of the steps necessary to establish a connection with an AN only to find out that it cannot deliver the desired performance. Yet another approach is a handoff from WiFi to cellular, which typically involves setting a communication session on the cellular side, with session setup contributing to the handoff break. However, 3GPP does not specify all of the steps required to accomplish such handoffs.

BRIEF DESCRIPTION OF THE DRAWINGS

The present disclosure may be understood, and its numerous objects, features and advantages obtained, when the following detailed description is considered in conjunction with the following drawings, in which.

DETAILED DESCRIPTION

Figure 1:
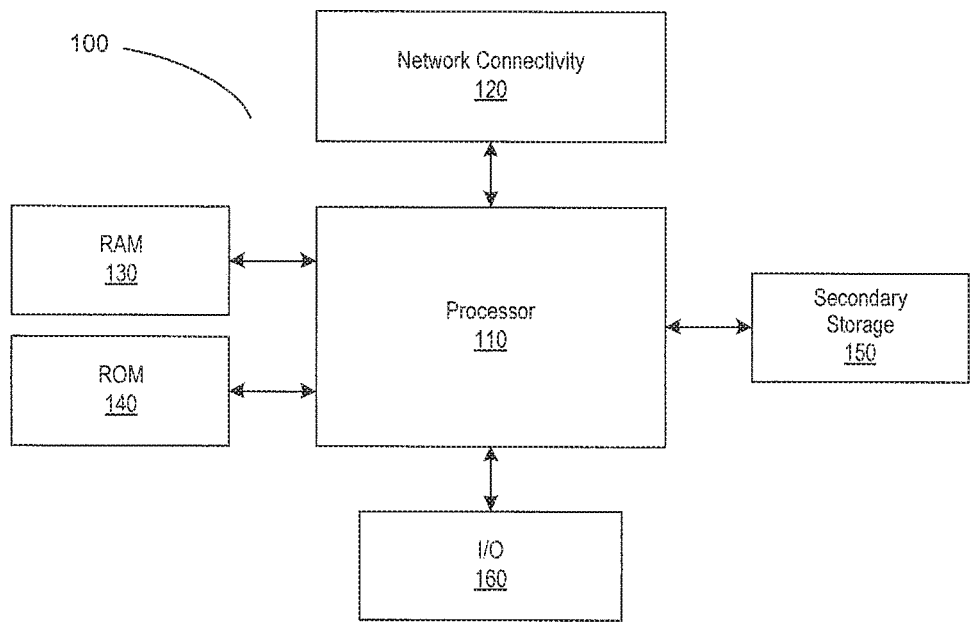
FIG. 1 depicts an exemplary system in which the present disclosure may be implemented.

The present disclosure is directed in general to communications systems and methods for operating same. In one aspect, the present disclosure relates to devices and methods for selecting an optimal access network in a wireless communications environment, such as when offloading mobile data traffic.

An embodiment is directed to a communication device, comprising processing logic configured to: generate a set of communication environment identification data corresponding to the location of said communication device, generate a set of observed communication performance data corresponding to the location of said communication device, and transmit said set of communication environment identification data and said set of observed communication performance data to a server, such that wireless communication is facilitated.

An embodiment is directed to a communication device, comprising processing logic configured to: generate a set of communication environment identification data corresponding to the location of said communication device, transmit said set of communication environment identification data as a key to a server and, in response thereto, receiving from said server a set of processed information items relevant to the key, and use said processed information items, with other information, such as policy and real-time data, to select an access node, such that wireless communication is facilitated.

An embodiment is directed to a communication device, comprising processing logic configured to: generate a set of communication environment identification key data corresponding to the location of said communication device, transmit said set of communication environment identification data to a server and, in response thereto, receiving from said server a set of location data within an accuracy meeting the requirement of an external database, provide said set of location data to an external database such as the Access Network Discovery and Selection Function (ANDSF) server and, in response thereto, receiving from said external database a set of access node attribute data, and use said access node attribute data to select an access node, such that wireless communication is facilitated.

Devices and methods are provided for selecting an optimal access network in a wireless communications environment, such as when offloading mobile data traffic. In various embodiments disclosed herein, a contributing device comprises processing logic configured to: generate set of communication environment identification data corresponding to the location of the communication device; generate a set of observed AN availability and communication performance data corresponding to the location of the communication device; and transmit the set of communication environment identification data and the set of observed communication performance data to a server. In some embodiments, the contributing device is a communication device. In some embodiments, the contributing device is location-aware and in some embodiments, the contributing device is location-unaware. The set of communication environment identification data comprises location data corresponding to the geographical location of the communication device.

In other embodiments disclosed herein, a communication device comprises processing logic configured to: generate a set of communication environment identification data corresponding to the location of the communication device; transmit the set of communication environment identification data as a key to a server and, in response thereto, receiving from the server a set of processed information items relevant to the key; and use the processed information items, with other information, to select an AN based on a predetermined set of communication optimization criteria.

In yet another embodiment of the disclosure, a communication device comprises processing logic configured to: generate set of communication environment identification key data corresponding to the location of the communication device; transmit the set of communication environment identification data to a server and, in response thereto, receiving from the server a set of location data; prove the set of location data to an external database such as an Access Network Discovery and Selection Function (ANDSF) server and, in response thereto, receiving from the ANDSF server a set of AN attribute data and use the AN attribute data to select an AN based on a predetermined set of communication optimization criteria Various illustrative embodiments of the present disclosure will now be described in detail with reference to the accompanying figures. While various details are set forth in the following description, it will be appreciated that the present disclosure may be practiced without these specific details, and that numerous implementation-specific decisions may be made to the disclosure described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flowchart form, rather than in detail, in order to avoid limiting or obscuring the present disclosure. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, software, a combination of hardware and software, or software in execution. For example, a component may be, but is not limited to being, a processor, a process running on a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server).

Examples of local area network (LAN) or wide area network (WAN) nodes include computers, packet switches, cable modems, Data Subscriber Line (DSL) modems, and wireless LAN (WLAN) ANs. Examples of Internet or Intranet nodes include host computers identified by an Internet Protocol (IP) address, bridges and WLAN ANs. Likewise, examples of nodes in cellular communication include base stations, relays, base station controllers, radio network controllers, home location registers, Gateway GPRS Support Nodes (GGSN), Serving GPRS Support Nodes (SGSN), Mobility Management Entity (MME), Serving Gateways (S-GW), and Packet Data Network Gateways (PDN-GW).

Other examples of nodes include mobile devices, server nodes, peer nodes and access nodes. As used herein, a mobile device may refer to wireless devices such as mobile telephones, smart phones, personal digital assistants (PDAs), handheld devices, portable computers, tablet computers, and similar devices or other user equipment (UE) that has telecommunications capabilities. Such mobile devices may likewise refer to a mobile, wireless device, or conversely, to devices that have similar capabilities that are not generally transportable, such as desktop computers, set-top boxes, or sensors. Likewise, a server node, as used herein, refers to an information processing device (e.g., a host computer), or series of information processing devices, that perform information processing requests submitted by other nodes. As likewise used herein, a peer node may sometimes serve as mobile device, and at other times, a server node. In a peer-to-peer or overlay network, a node that actively routes data for other networked devices as well as itself may be referred to as a supernode.

An access node, as used herein, refers to a node that provides a mobile device access to a communication environment. Examples of access nodes include cellular network base stations and wireless broadband, e.g., WiFi, WiMAX, etc, ANs, which provide corresponding cell and WLAN coverage areas. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices.

In general, a coverage area of less than two kilometers typically corresponds to a microcell, 200 meters or less for a picocell, and on the order of 10 meters for a femtocell. As likewise used herein, a mobile device communicating with an access node associated with a macrocell is referred to as a "macrocell client." Likewise, a mobile device communicating with an access node associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

FIG. 1 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity interfaces 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity interfaces 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity interfaces 120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, long term evolution (LTE) radio transceiver devices, worldwide interoperability for microwave access (WiMAX) devices, and/or other well-known interfaces for connecting to networks, including Personal Area Networks (PANs) such as Bluetooth. These network connectivity interfaces 120 may enable the processor 110 to communicate with the Internet or one or more telecommunications networks or other networks from which the processor 110 might receive information or to which the processor 110 might output information.

The network connectivity interfaces 120 may also be capable of transmitting or receiving data wirelessly in the form of electromagnetic waves, such as radio frequency signals or microwave frequency signals. Information transmitted or received by the network connectivity interfaces 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may likewise be used to store instructions and data that is read during execution of the instructions. The secondary storage 150 is typically comprised of one or more disk drives or tape drives and may be used for non-volatile storage of data or as an overflow data storage device if RAM 130 is not large enough to hold all working data. Secondary storage 150 may likewise be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper tape readers, printers, video monitors, or other well-known input/output devices.

Figure 2:
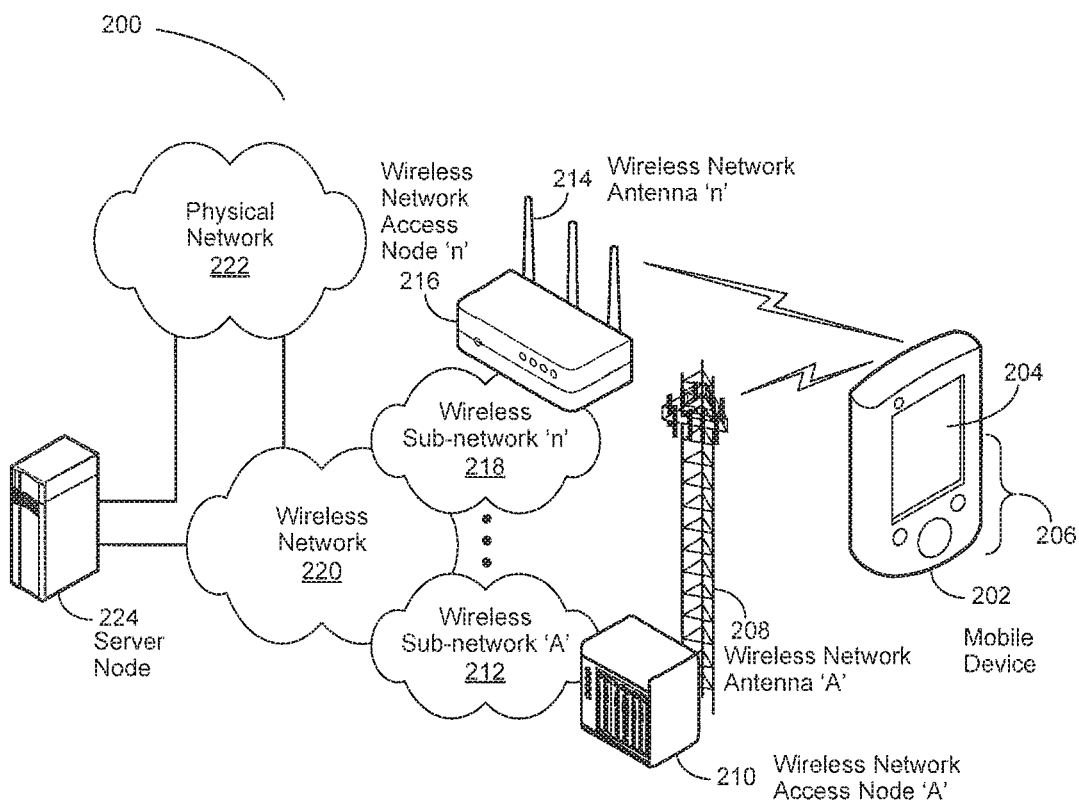
FIG. 2 shows a wireless-enabled communications environment including an embodiment of a mobile device.

FIG. 2 shows a wireless-enabled communications environment including an embodiment of a mobile device as implemented in an embodiment of the disclosure. Though illustrated as a mobile phone, the mobile device 202 may take various forms including a wireless handset, a pager, a smart phone, or a personal digital assistant (PDA). In various embodiments, the mobile device 202 may also comprise a portable computer, a tablet computer, a laptop computer, or any computing device operable to perform data communication operations. Many suitable devices combine some or all of these functions. In some embodiments, the mobile device 202 is not a general purpose computing device like a portable, laptop, or tablet computer, but rather is a special-purpose communications device such as a telecommunications device installed in a vehicle. The mobile device 202 may likewise be a device, include a device, or be included in a device that has similar capabilities but that is not transportable, such as a desktop computer, a set-top box, or a network node. In these and other embodiments, the mobile device 202 may support specialized activities such as gaming, inventory control, job control, task management functions, and so forth.

In various embodiments, the mobile device 202 includes a display 204. In these and other embodiments, the mobile device 202 may likewise include a touch-sensitive surface, a keyboard or other input keys 206 generally used for input by a user. The input keys 206 may likewise be a full or reduced alphanumeric keyboard such as QWERTY, Dvorak, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be inwardly depressed to provide further input function. The mobile device 202 may likewise present options for the user to select, controls for the user to actuate, and cursors or other indicators for the user to direct.

The mobile device 202 may further accept data entry from the user, including numbers to dial or various parameter values for configuring the operation of the mobile device 202. The mobile device 202 may further execute one or more software or firmware applications in response to user commands. These applications may configure the mobile device 202 to perform various customized functions in response to user interaction. Additionally, the mobile device 202 may be programmed or configured over-the-air (OTA), for example from a wireless network access node 'A' 210 through 'n' 216 (e.g., a base station), a server node 224 (e.g., a host computer), or a peer mobile device 202.

Among the various applications executable by the mobile device 202 are a web browser, which enables the display 204 to display a web page. The web page may be obtained from a server node 224 through a wireless connection with a wireless network 220. As used herein, a wireless network 220 broadly refers to any network using at least one wireless connection between two of its nodes. The various applications may likewise be obtained from a peer mobile device 202 or other system over a connection to the wireless network 220 or any other wirelessly-enabled communication network or system.

In various embodiments, the wireless network 220 comprises a plurality of wireless sub-networks (e.g., cells with corresponding coverage areas) 'A' 212 through 'n' 218. As used herein, the wireless sub-networks 'A' 212 through 'n' 218 may variously comprise a mobile wireless access network or a fixed wireless access network. In these and other embodiments, the mobile device 202 transmits and receives communication signals, which are respectively communicated to and from the wireless network nodes 'A' 210 through 'n' 216 by wireless network antennas 'A' 208 through 'n' 214 (e.g., cell towers). In turn, the communication signals are used by the wireless network access nodes 'A' 210 through 'n' 216 to establish a wireless communication session with the mobile device 202. As used herein, the network access nodes 'A' 210 through 'n' 216 broadly refer to any access node of a wireless network. As shown in FIG. 2, the wireless network access nodes 'A' 210 through 'n' 216 are respectively coupled to wireless sub-networks 'A' 212 through 'n' 218, which are in turn connected to the wireless network 220.

In various embodiments, the wireless network 220 is coupled to a physical network 222, such as the Internet. Via the wireless network 220 and the physical network 222, the mobile device 202 has access to information on various hosts, such as the server node 224. In these and other embodiments, the server node 224 may provide content that may be shown on the display 204 or used by the mobile device processor 110 for its operations. Alternatively, the mobile device 202 may access the wireless network 220 through a peer mobile device 202 acting as an intermediary, in a relay type or hop type of connection. As another alternative, the mobile device 202 may be tethered and obtain its data from a linked device that is connected to the wireless network 212. Skilled practitioners of the art will recognize that many such embodiments are possible and the foregoing is not intended to limit the spirit, scope, or intention of the disclosure.

Figure 3:
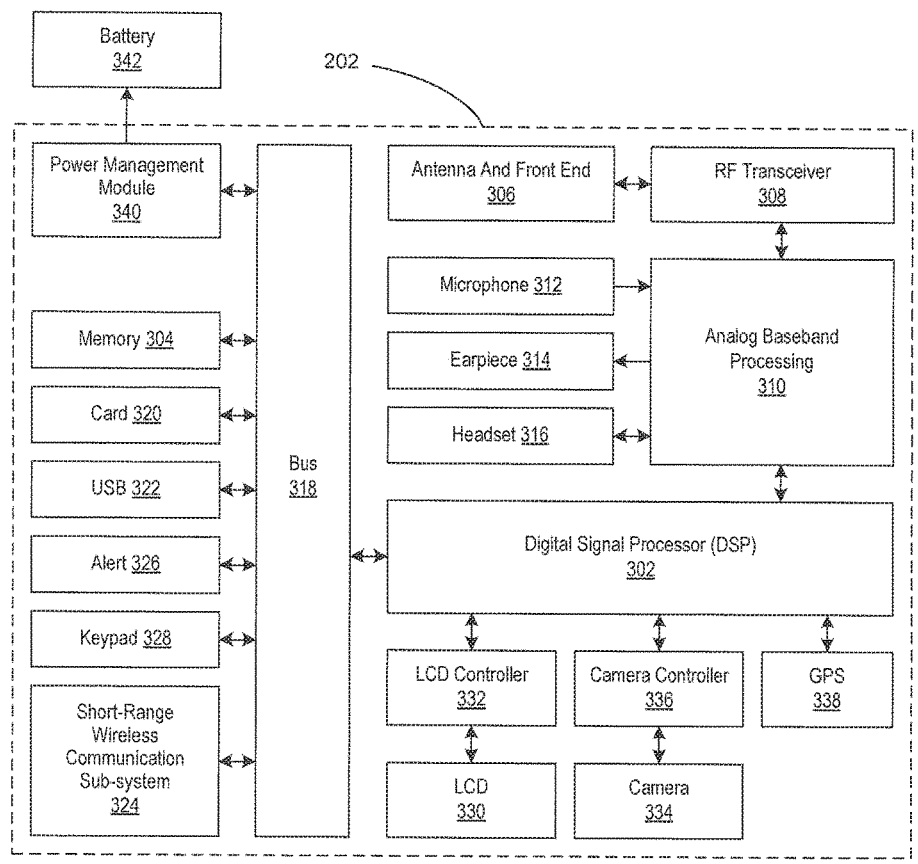
FIG. 3 is a simplified block diagram of an exemplary mobile device comprising a digital signal processor (DSP)

FIG. 3 depicts a block diagram of an exemplary mobile device as implemented with a digital signal processor (DSP) in accordance with an embodiment of the disclosure. While various components of a mobile device 202 are depicted, various embodiments of the mobile device 202 may include a subset of the listed components or additional components not listed. As shown in FIG. 3, the mobile device 202 includes a DSP 302 and a memory 304. As shown, the mobile device 202 may further include an antenna and front end unit 306, a radio frequency (RF) transceiver 308, an analog baseband processing unit 310, a microphone 312, an earpiece speaker 314, a headset port 316, a bus 318, such as a system bus or an input/output (I/O) interface bus, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338, and a power management module 340 operably coupled to a power storage unit, such as a battery 342. In various embodiments, the mobile device 202 may include another kind of display that does not provide a touch sensitive screen. In one embodiment, the DSP 302 communicates directly with the memory 304 without passing through the input/output interface 318.

In various embodiments, the DSP 302 or some other form of controller or central processing unit (CPU) operates to control the various components of the mobile device 202 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the mobile device 202 to send and receive information from a cellular network or some other available wireless communications network or from a peer mobile device 202. In an embodiment, the antenna and front end unit 106 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 306 may include antenna tuning or impedance matching components, RF power amplifiers, or low noise amplifiers.

In various embodiments, the RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 108, portions of the Antenna and Front End 306, and the analog base band processing unit 310 may be combined in one or more processing units and/or application specific integrated circuits (ASICs).

The analog baseband processing unit 310 may provide various analog processing of inputs and outputs, for example analog processing of inputs from the microphone 312 and the headset 316 and outputs to the earpiece 314 and the headset 316. To that end, the analog baseband processing unit 310 may have ports for connecting to the built-in microphone 312 and the earpiece speaker 314 that enable the mobile device 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the mobile device 202 and may also enable the mobile device 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the mobile device 202 to communicate wirelessly with other nearby mobile devices and access nodes.

The input/output interface 318 may further connect the DSP 302 to the alert 326 that, when triggered, causes the mobile device 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the DSP 302 via the I/O interface 318 to provide one mechanism for the user to make selections, enter information, and otherwise provide input to the mobile device 202. The keyboard 328 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the mobile device 202 to take digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals or other navigational signals, thereby enabling the mobile device 202 to determine its position. Various other peripherals may also be included to provide additional functions, such as radio and television reception.

Those of skill in the art are aware that offloading mobile data traffic from cellular networks to alternative access networks not only helps to alleviate usage loads on licensed spectrum, but likewise mitigates the costs of upgrading radio access and backhaul network infrastructures. Alternative access network technologies for offloading include Wireless Fidelity (WiFi), based on the IEEE 802.11x standards, which is capable of providing high throughput (e.g., hundreds of Mbps with 802.11n). Furthermore, WiFi is cost effective, has a widely deployed infrastructure, and is widely supported in mobile devices. In addition, today's users are typically within Wi-Fi coverage areas for a significant percentage of the time they are using their mobile devices. One current example of using WiFi for offloading mobile data traffic from cellular networks is the 3rd Generation Partnership Project (3GPP).

Various mechanisms for offloading traffic from cellular to Wi-Fi have been defined by 3GPP, including Access Network Discovery and Selection Function (ANDSF), IP Flow Mobility (IFOM), and Multi-Access PDN Connectivity (MAPCON). More specifically, ANDSF is a network entity managed by the network operator that sends data to the mobile devices to provide a list of locally available access networks. The list further includes information such as the access technology type, such as whether it is a wireless local area network (WLAN), Worldwide Interoperability for Microwave Access (WiMAX), etc. The list likewise provides the radio access network identifier, such as the Service Set Identifier (SSID) of a WLAN, and other technology specific information. For example, one or more carrier frequencies and their associated validity conditions may be provided. Such validity conditions may include conditions indicating when the provided access network discovery information is valid or their corresponding location. The ANDSF likewise communicates the operator's rules and preferences to decide when inter-system mobility is allowed or restricted and to select the most preferable access technology type or access network that should be used to access the Evolved Packet Core (EPC). Likewise, IFOM enables seamless offloading on a per-IP flow basis. For each Packet Data Network (PDN) connection, the mobile device can route some IP flows over one access and other flows on a different access. In concert, MAPCON enables seamless offloading on a per-PDN connection basis by moving one or more PDN connections between accesses.

To fully realize the benefits of offloading, the mobile device should either switch (i.e., "handoff") to a more optimal access method when it becomes available during a communication session, or alternatively, select the most optimal access method available (i.e., "idle mobility") when initiating a new session. More advanced approaches involve the simultaneous use of multiple access technologies and methods to achieve a more seamless transition between accesses, increase throughput, and improve performance metrics through path diversity. It will be appreciated that the performance metric could be based on other considerations than just throughput. For example, additional considerations could include delay, power consumption, etc.

However, 3GPP does not specify all of the steps required for a mobile device to achieve a seamless heterogeneous, or vertical, handoff between cellular and Wi-Fi. More specifically, inter-radio-access-technology (RAT) handoffs within existing 3GPP specifications do not cover the case where the RAT is a Wi-Fi variant of IEEE 802.11. Generically, a handoff to a Wi-Fi AN involves performing a number of steps, each of which contributes to handoff delay. These steps, which may be performed in different sequences or combined, are equally applicable to cellular to Wi-Fi as well as Wi-Fi to Wi-Fi handoff and include:

1. Determine that the radio connection to the access method, or cell, is no longer acceptable. If the handoff is motivated by offloading, this step may be skipped.

2. Determine what alternative access methods, or cells, are available for handoff.

3. Determine if the alternative access method, or cell, would provide a better connection than the current access method. For example, if throughput is the criterion to determine optimality, determine whether the alternative access method would provide sufficient throughput for the currently running application.

4. Select one alternative access method among those that are available as a target for handoff.

5. Establish connection on the new access method, which may include authentication, authorization, radio and network resource reservation, setup of new mobility tunnel, security setup, etc.

Skilled practitioners of the art will be aware that ANDSF can assist in speeding up steps 2 and 4 when the current access method is 3GPP. Likewise, IEEE has defined 802.11u to speed up steps 2 and 4 when the current access method is Wi-Fi. However, ANDSF is optional in 3GPP, and it is not currently anticipated that 802.11u will systematically be implemented, especially for unmanaged Wi-Fi access such as home Wi-Fi. Furthermore, 3GPP does not specify steps 3, 4 and 5 for handoff from cellular to Wi-Fi.

Moreover, those of skill in the art will likewise be aware that other issues have been identified regarding steps 3, 4 and 5. For example, in steps 3 and 4, the mobile device typically measures the received signal strength (RSS) and uses it as the decision criterion. However, RSS is not a reliable criterion as performance metrics that matter to the application, such as throughput, delay, loss rates, etc. typically depend on other factors as well. These factors include interference levels and traffic loads on the AN and its supporting backhaul network. As a result, the mobile device may perform all of the steps necessary to establish a connection with an AN only to find out that it cannot deliver the desired performance. Likewise, step 5 typically involves several steps, each of which may vary and likewise have an associated delay that is variable.

Various approaches are known for addressing the above issues. One such approach includes having the mobile device learn from its past experience in order to optimize its decision. For example, if the device has consistently experienced better performance with AN 'A' than with AN 'B' in the past, then the mobile device will tend to select AN 'A'.

Another known approach is for the mobile device to anticipate the actions it needs to take to speed up the handoff process. For example, a mobile device can estimate its trajectory and speed and predict its future location 'Y' in 'X' seconds. In this approach, the device knows from past experience, and from data provided by the ANDSF, that AN 'Z' is available at location 'Y', and furthermore that AN 'Z' consistently provided acceptable performance. Based on that information, the mobile device can start step 3 ahead of time to establish connection with AN 'Z'.

Yet another approach is based on collaboration among mobile devices. In this approach, the mobile device discovers what access options are available, determines whether they would provide sufficient performance for the application, and then selects the best one. To do so, the mobile device queries other mobile devices for a variety of information, such as the received signal strength (RSS) of an AN, and then uses it as decision criteria. The shared information is multicast. However, in the case of idle mobility, step 1 of the handoff process does not apply. Yet the mobile device still needs to determine what access methods are available, whether they would provide sufficient performance for the application, and then select the best one. Accordingly, the same issues as in steps 2, 3 and 4 of the handoff process need to be addressed.

In various embodiments, the collective past experience of a plurality of mobile devices is analyzed to adapt each individual device's future behavior for more optimal performance. In these various embodiments, each mobile device sends various reports to a collaboration server, which processes the information. In turn, the collaboration server distributes the processed information back to the mobile devices. Each mobile device can then combine the processed information with its own past experience to optimize handoff/idle mobility decisions and speed up handoff execution. It will be appreciated that the term "server" does not necessarily imply a centralized physical entity, and the collaboration server could be implemented in a variety of ways.

Those of skill in the art will realize that a mobile device does not generally know its precise geographic location unless it is equipped with a Global Positioning System (GPS) receiver and is receiving strong direct path satellite signals, such as in open outdoor areas. Accordingly, as used herein, a mobile device that is capable of determining its physical location with some degree of accuracy is referred to as a "location-aware device".

However, even if a mobile device's geographic location is not known, it can still report on its signal environment survey and retrieve processed information from the collaboration server based on the specific characteristics of the radio signals it receives. In general, as used herein, a signal environment survey, or "radio signature," can be obtained by using a device to obtain data relating to obtain any type of communication signal data that can be gathered by listening to the radio environment. For example, in a geographic area covered by a cellular system and partially covered by WLAN, different locations will receive different combinations of radio signals from each cellular base station or WLAN AN that is in range. The combination of those received signal characteristics represents a radio signature at a specific location. Accordingly, the radio attributes that make up the signature may include radio characteristics such as received signal strength, radio mobile device transmit timing adjustment, angle of arrival, multipath delay distribution and others. More generally, the radio attributes may likewise comprise a technology ID identifying the technology implemented by the access node (e.g., HSPA, LTE, 802.11g, 802.11n, etc.). An example of such a radio signature is the tuple of AN ID '1', AN ID '2', and AN ID '3', along with their corresponding radio attributes, where AN ID 'x' is the identifier of the AN, which in various embodiments may be a cellular base station, WLAN AN, or an AN of some other technology as described in greater detail herein.

In general, different geographic locations will produce different radio signatures within the service region. However, there is a slight chance that different locations may produce very similar radio signatures, especially when there are a small number of base stations and ANs in range of the mobile device.

In various embodiments, individual mobile devices may collect information on the performance observed with the various ANs, which may be provided in the form of reports to the collaboration server. A report generally consists of Environment Identification Data (EID), along with data on the AN availability and performance observed by the device when the device was in the environment identified by the EID.

Various types of EIDs are possible. For example, one type of EID (type A) can be the device's location, along with the identity information corresponding to each AN that the device was able to detect. Another type of EID (type B) can be a radio signature measured by the device. Another possible type of EID (type C) is the joint location and radio signature, i.e. the device's location and the radio signature measured by the device when it was in that location, along with information corresponding to each AN that the device was able to detect. Type A, type B and type C reports are reports which contain type A, type B and type C EIDs respectively. A location-aware device may send any of the 3 types of reports. A non-location-aware device only sends type B reports.

Examples of data on performance observed by the device include:

R-2: Histogram of received signal strength from AN 'X' in location 'L', for a location-aware device. In various embodiments, the histogram plots the frequency of occurrences vs. a given range of signal strengths.

R-3: If the device is location-aware, R-3 will contain the histogram of performance observed with AN 'X' for a given location 'L'. Alternatively, or if the device is not location-aware, then R-3 will contain the histogram of performance observed with AN 'X' for a given radio signature '$U_L$'. In either case, the information included in the R-3 report are for time 'T', when the AN 'X' signal strength is '$S_L$' and chipset 'C' is used to connect to AN 'X'. In various embodiments, the observed performance may be related to throughput, delay, loss rates, power consumption, etc.

R-4: Authentication scheme, if any, used by AN 'X' and subnet information.

R-5: Histogram of latency observed to establish connection with AN 'X'.

R-6: Performance achieved with adaptive behavior as described in greater detail herein.

A device may send radio signature information to a server to obtain processed information regarding available access nodes. In this embodiment, the radio signature information is used as a "key" by the server to obtain processed information stored in a database as discussed in greater detail below.

In these various embodiments, the reports do not necessarily have to be sent in real-time. Instead, they can be stored in the mobile device and sent to the collaboration server when the conditions are favorable. For example, they may be sent when high bandwidth or high battery levels are present, or alternatively, when the device is connected to a power source.

Figure 4A:
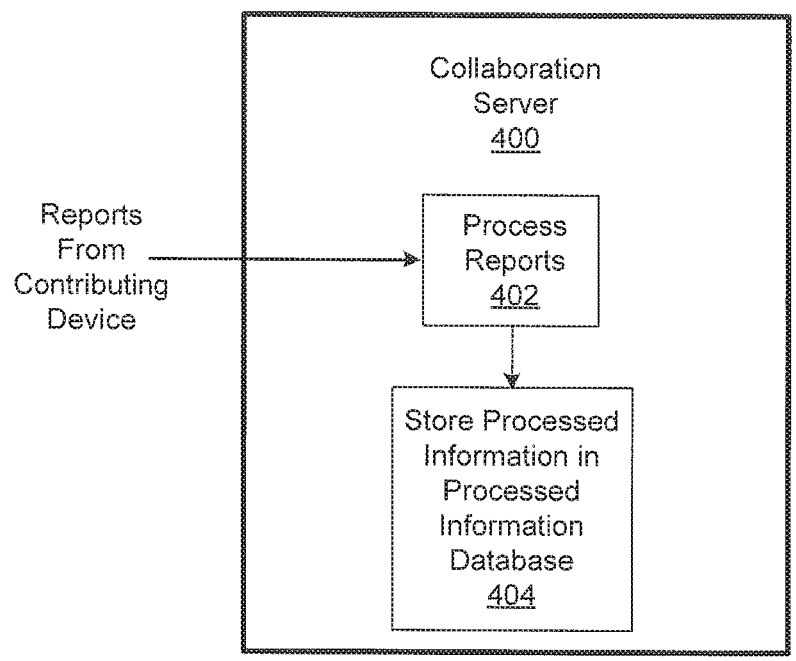
FIG. 4a is an illustration of a collaboration server that is operable to receive report input data from contributing devices and to generate processed information therefrom.

FIG. 4a is an illustration of a collaboration server 400 that is operable to receive report input data and to generate processed information for use by a communication device. The collaboration server processes the reports in step 402 and stores the processed information in a Processed Information database, in step 404.

In various embodiments, the Processed Information may include the following:

Which ANs are available, along with their technology types and identities, for a given geographical area or radio signature.

For each AN, attributes such as:

AN-1: SSID and authentication scheme, subnet information

AN-2: Statistical distribution of latency for connection establishment, which could be refined with distributions specific to the time of day and day of week AN-3: Distribution of performance observed for a given received signal strength (RSS), for a given location 'L' and given chipset 'C'. The observed performance could be throughput, power consumption, etc., any or all of which may be dependent upon the time of day or day of the week, which could be further refined with associated distributions AN-4: Statistical distribution of received signal strength as a function of the location 'L', for a given chipset 'C'

AN-5: Statistical distribution of traffic load, which could be refined with distributions specific to the time of day and day of week. Likewise, the load could be based on round trip time measurements made by the devices.

Figure 5:
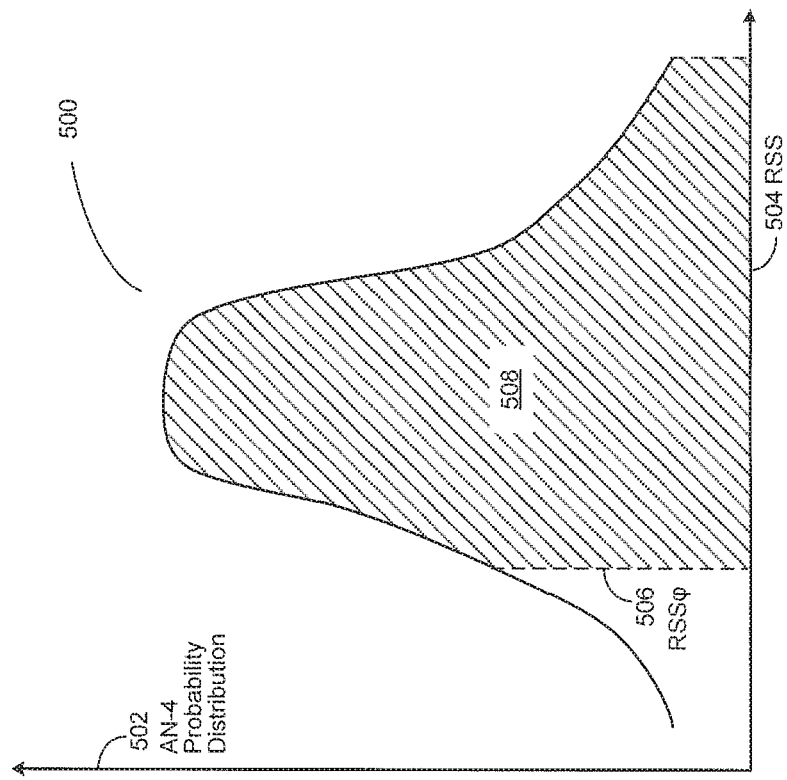
FIG. 5 is a simplified graphical depiction of AN attributes 'AN-4'.

AN-6: Distribution of performance observed for a given signature, for a given chipset 'C', which could be refined with distributions specific to the time of day and day of week BEST-R-6: Consolidated view of the devices' R-6 reports, from which the collaboration server can determine which adaptive behaviors work best and communicate them back to the devices Non-AN-specific information, including:

Distribution of performance observed for a given received signal strength, for a given chipset (this is AN-3 consolidated across geographical areas Consolidated view of the devices' adaptive behavior and the resulting performance (this is BEST-R-6 consolidated across geographical areas FIG. 5 is a simplified graphical depiction of AN attribute 'AN-4' as implemented in accordance with an embodiment of the disclosure. In this embodiment, the probability distribution 502 of 'AN-4' is plotted against the received signal strength (RSS) 504 of an AN for a given location L and a predetermined chipset C. As shown in FIG. 5, $RSS_{\varphi}$ 506 represents a minimum RSS 504 and the shaded area under the 'AN-4' distribution curve 500 represents the RSS confidence level RSS_Conf 508 as described in greater detail herein.

Figure 6:
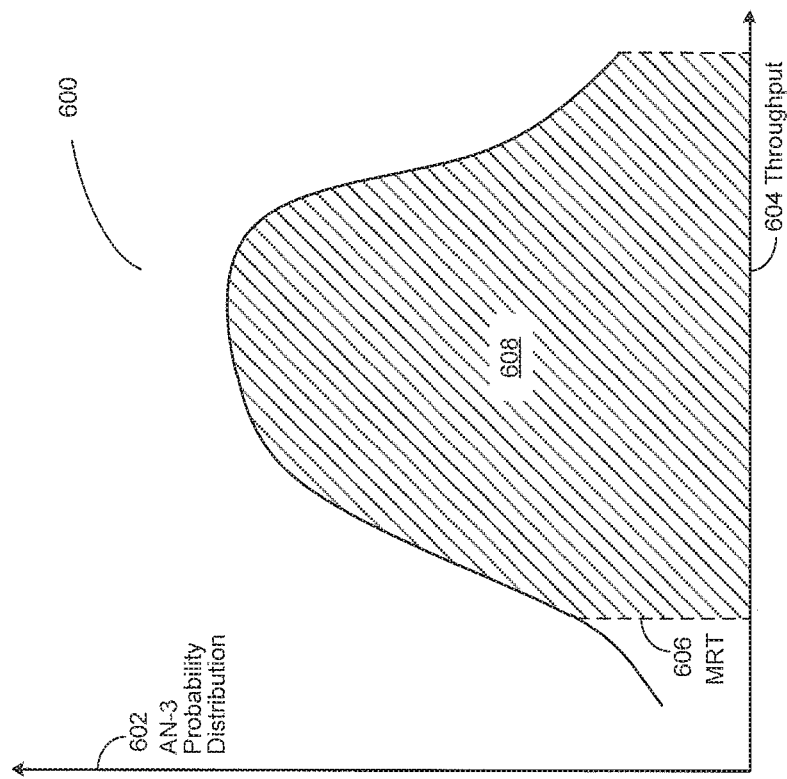
FIG. 6 is a simplified graphical depiction of AN attributes 'AN-3'.

FIG. 6 is a simplified graphical depiction of AN attribute 'AN-3' as implemented in accordance with an embodiment of the disclosure. In this embodiment, the probability distribution 602 of 'AN-3' is plotted against the throughput 604 for a given received signal strength (RSS) range (e.g., $RSS_x$, $RSS_y$) and a predetermined chipset 'C'. As shown in FIG. 6, MRT 606 represents the minimum required throughput and the shaded area under the 'AN-3' distribution curve 600 is compared with the throughput confidence level Tpt_Conf 608 as described in greater detail herein. In various embodiments, the distribution of performance for a predetermined RSS, for a predetermined location 'L', and a predetermined chipset 'C' is refined with distributions specific to time of day and day of week.

Referring again to FIGS. 4b-e, in some embodiments disclosed herein, the collaboration server 400 is operable to receive a key from a consuming device, and in response to the key, is further operable to provide processed information relevant to that key. In some embodiments, the key is an EID, as described hereinabove.

Figure 4B:
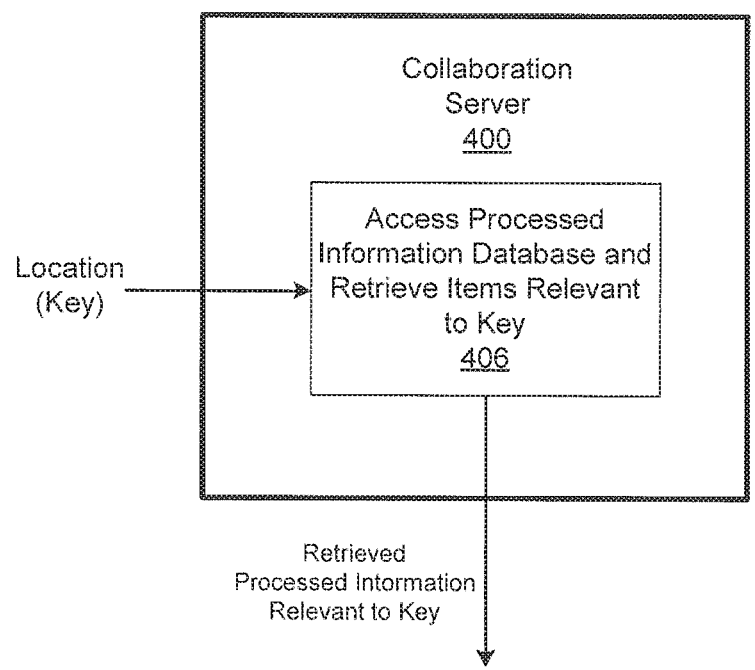
FIG. 4b is an illustration of a collaboration server that is operable to receive location key data from consuming devices and to provide processed information items relevant to the corresponding key.

In one embodiment, shown in FIG. 4b, location information from a location-aware device can be used as a key to directly access processed information from the processed information database in step 406.

In other embodiments, the key may be a radio signature, as illustrated in FIGS. 4 c-d. In the embodiment shown in FIG. 4c, a radio signature matching module is used to process the radio signature key in step 410 to generate a list of the the top "N" matching signatures. In step 412, the top "N" matching radio signatures are used to access the processed information database 404 to retrieve items relevant to the top "N" relevant matching signatures. This information may then be provided to one or more mobile devices.

Figure 4C:
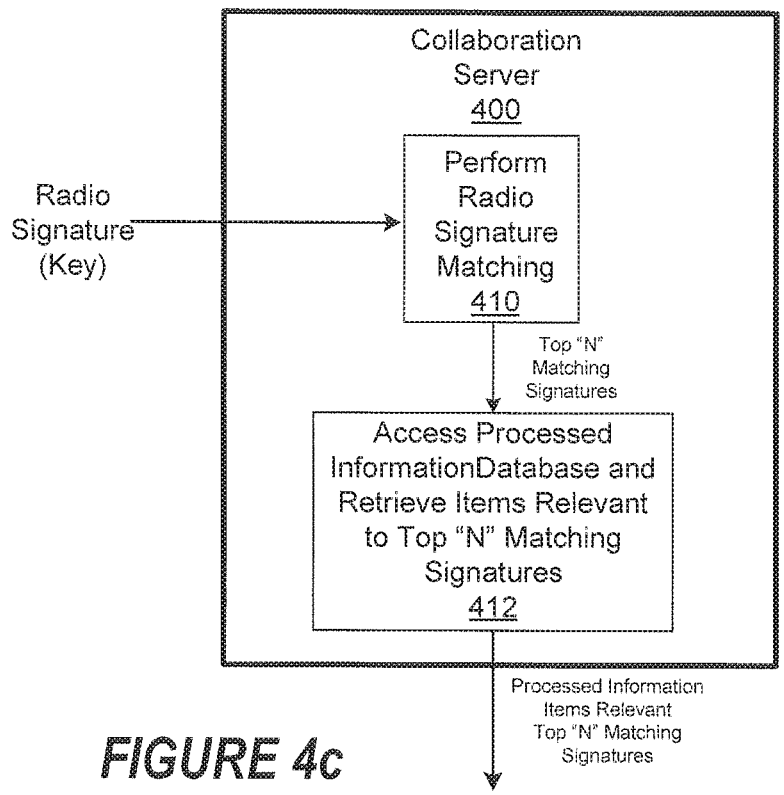
FIG. 4c is an illustration of a collaboration server that is operable to receive radio signature data used as a key and to provide processed information items corresponding to a set of the top "N" radio signature matches in response to said radio signature key data.
Figure 4D:
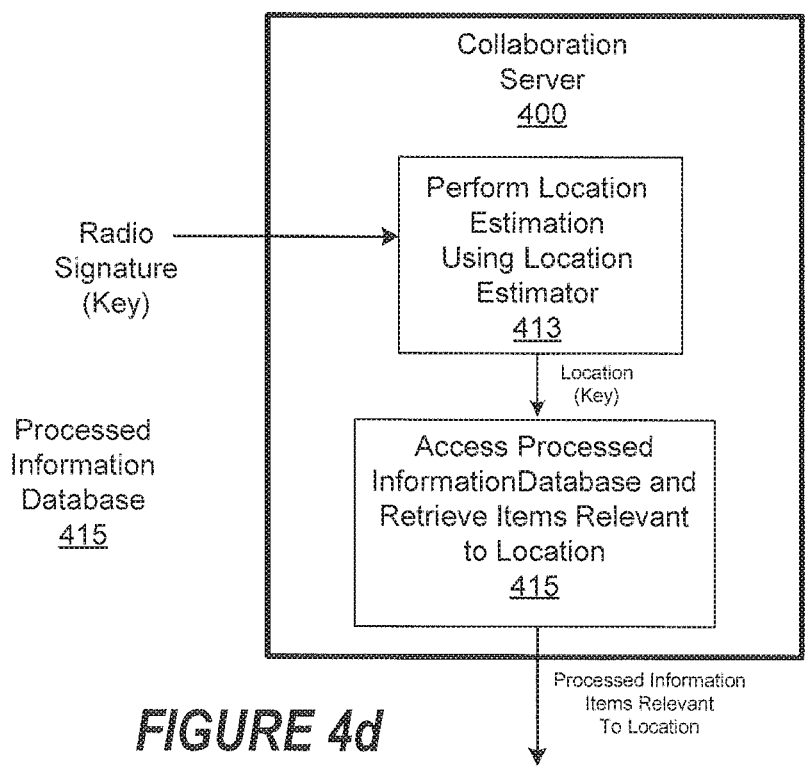
FIG. 4d is an illustration of a collaboration server that is operable to receive radio signature data used as a key and to provide processed information items in response to location key data generated using said radio signature data.

In another embodiment, shown in FIG. 4d, the radio signature key data is used to perform location estimation using a location estimator in step 413. The location information generated by the location estimator in step 413 can then be used as a key to retrieve processed information from the processed information database as shown in step 415.

In another embodiment, the information in Type C reports, i.e., the joint location information and radio signature information, are processed to help correlate the locations with the radio signatures. Such correlation can be used by the location estimator to generate location information that can be used as a key to retrieve the processed information from the database 404.

In another embodiment, when the key is a radio signature, the processes disclosed in FIGS. 4c-d can be used jointly, and the two sets of processed information items resulting from these options can be combined into a single set of processed information items provided to the consuming device.

As discussed herein above, each of the Type A, B, and C reports may include observed communication performance data for the ANs they are able to detect. This information can be used by the collaboration server 400 to update the information contained in the database.

Figure 4E:
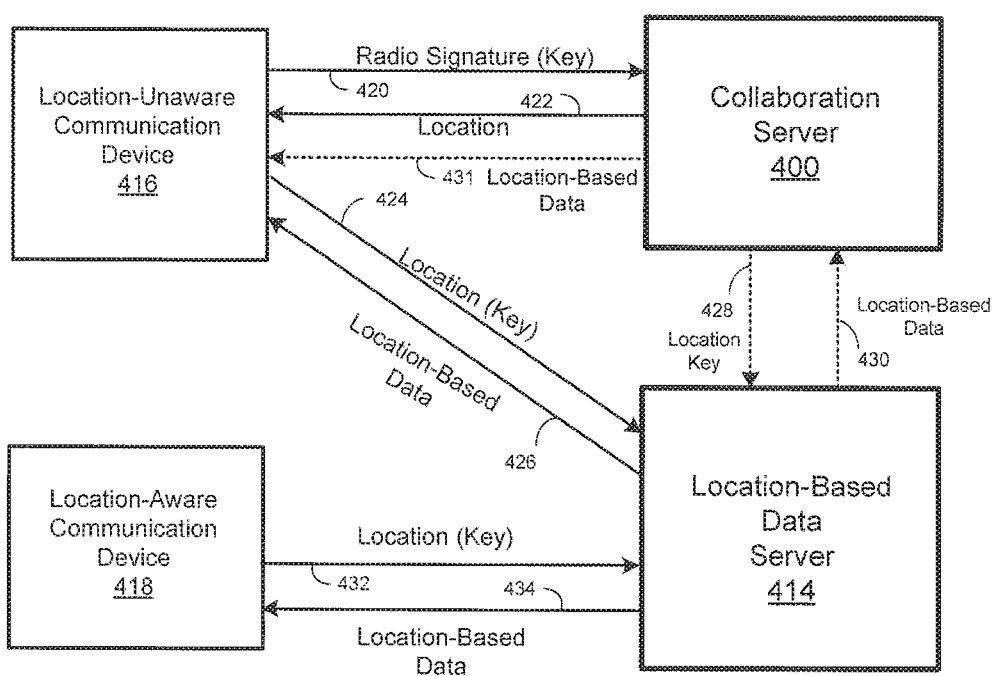
FIG. 4e is an illustration of the process flow for using a collaboration server and an external location-based database server to provide processed information for use by location-unaware communication devices.

FIG. 4e is an illustration of the process flow for using a collaboration server 400 to derive a location information for a non-location-aware device, so the location information can be used to access an location-based information external database 414, such as an Access Network Discovery and Selection Function (ANDSF) server. The same flow can be used when a device knows its location, but not to the degree of accuracy required to access the external database. In that case, the collaboration server can help to improve the accuracy of the device's location information to the degree that the external database can be used. In one embodiment, the location-unaware device provides radio signature information as a key to the collaboration server 400, as illustrated by process flow 420. The location estimator in the collaboration server 400 processes the radio signature information to generate location information that is sent to the location-unaware communication device 416, as illustrated by process flow 422. The location unaware communication device

416 then sends the location key information to the Location-Based Data server 414 as illustrated by process flow 424. The Location-Based Data Server 414 uses the location key information to generate information relevant to that location (e.g. a list of ANs and associated AN attributes) that is sent to the location unaware communication device, as illustrated by process flow 426. In another embodiment the collaboration server 400 uses the radio signature information to generate location information that is sent to the Location-Based Data server 414, as shown by process step 428. The Location-based Data server 414 uses the location information to generate location-based information relevant to that location (e.g. a list of ANs, etc.) that is sent to the collaboration server 400, as illustrated by process step 430. In this embodiment, the collaboration server 400 then sends the location-based data directly to the location-unaware device 416, as shown by process step 431.

In some embodiments, the location aware communication device 418 is operable to generate location key information that can be sent to the Location-based Data server 414, as shown in process step 432. The Location-Based Data Server 414 uses the location key information to generate a list of ANs that is then returned to the location-aware communication device 416, as shown in process step 432. Those of skill in the art will recognize that it is possible to operate the non-location-aware device 416 in a location-aware mode using the techniques discussed above in connection with location-unaware device 416.

The mobile device utilizes the Processed Information received from the collaboration server 400 to derive candidate ANs and to optimize handoff decisions and handoff speed. In some embodiments, the candidate ANs are derived according to predetermined policies, such as cost, network operator preferences, etc., along with possible real-time data from other sources.

In these various embodiments, the performance that can be achieved for each candidate AN is estimated. For a location-aware device, the estimated performance can be based on the actual received signal strength and attribute AN-3 of the AN. For a non-location-aware device, it can be based on the matching signature and attribute AN-6. Alternatively, if measuring the signal strength for all candidates is too costly, a location-aware device can do the estimation using attributes AN-3 and AN-4. For example, the mobile device can perform the operations described in FIG. 7 to estimate throughput performance for one or more available ANs. In various embodiments, the mobile device may not perform the estimation for all available ANs, but only for a subset, due to various limitations such as time availability, processing capabilities, power reserves, etc. The information thus obtained can also be combined with policy considerations and real-time data (e.g., the current congestion level of an AN) obtained from other sources to select the optimal candidate. As another example, when the mobile device can predict how throughput performance will evolve along its predicted trajectory by performing the operations described in FIG. 8.

Likewise, the mobile device can use AN attribute 'AN-2' to estimate the latency to establish a connection with each candidate AN when connection establishment latency is an issue for the application. Based on the requirements of a given application, the mobile device can likewise use the performance and connection establishment latency estimations, and possibly policy considerations or real-time data (e.g., the current congestion level of an AN) obtained from other sources as well, to select a candidate AN for handoff. For example, the latency consideration will carry more weight if the application requires a short break but tolerates low bandwidth. Additionally, when the mobile device can predict its trajectory and how the performance will evolve by using trajectory/location prediction and AN attribute 'AN-3' of the current AN, it can predict when the performance on the current AN will be too low and necessitate a handoff. Accordingly, handoff can be accelerated by the mobile device taking preparation steps prior to the handoff.

In various embodiments, the best access method for idle mobility is selected by determining the available ANs in the area, based on the processed information from the collaboration server, ANDSF data, or both. The candidate ANs are then derived from that list. In certain of these embodiments, the candidate ANs are derived according to a policy, such as cost, network operator preferences, etc. In these various embodiments, the performance that can be achieved for each candidate AN is estimated. For a location-aware device, the estimated performance can be based on the actual received signal strength and attribute AN-3 of the AN. For a non-location-aware device, it can be based on the matching signature and attribute AN-6. Alternatively, if measuring the signal strength for all candidates is too costly, a location-aware device can do the estimation using attributes AN-3 and AN-4. However, when the device is idle, measuring the RSS is unlikely to be an issue. Likewise, when the mobile device is able to predict its trajectory, it can predict how throughput performance will evolve. The mobile device can likewise use AN attribute 'AN-2' to estimate the latency to establish a connection with each candidate AN when connection establishment latency is an issue for the application. Based on the requirements of a given application, the mobile device can likewise use the performance and connection establishment latency estimations, and possibly policy considerations or real-time data obtained from other sources as well, to select a candidate AN. It will be appreciated by those of skill in the art that the foregoing is likewise applicable to identify the potentially best-performing AN when the mobile device is operating in an idle mobility mode.

In various embodiments, in the case of multi-access use, the mobile device has simultaneously established connections with multiple access methods and the decision to use a given access method can be made on a per-packet basis. In these embodiments, the device can use the information from the collaboration server to estimate the performance of a given access method and then determine whether it should establish a connection with that access method. The information can likewise be combined with policy considerations or real-time data obtained from other sources as well.

The mobile device may likewise use the information provided by the collaboration server to adapt its behavior. For example, if the application is relatively delay-tolerant (e.g. email), and a good connection does not currently exist with the current AN, but a better connection is predicted, the device may decide to postpone communication until the device is in the coverage of the better AN. The device can decide its own adaptive behavior or combine it with BEST-R-6 information provided by the collaboration server. In certain embodiments, the performance observed with the adapted behavior is reported back to the collaboration server (R-6), and the reports can be used to further refine the policy as part of a continuous feedback loop. Thereafter, the policy is shared among the devices.

In various embodiments, the processed information can be retrieved based on a given radio signature. For example, to retrieve the processed information based on a radio signature 'U' from a device, the collaboration server will attempt to match 'U' against the set of all stored signatures, pick the top 'N' best matches, retrieve the processed information, and return it to the mobile device. It will be appreciated by those of skill in the art that there are many ways to determine the pattern matching between the measured radio signature and radio signature of previously stored reports. One such approach is to use the following algorithm, which is based on a distance function on received signal strength to match the radio signature. It will likewise be appreciated that while the algorithm is oriented towards the received signal strength of the radio signature, it can be extended to other radio parameters such as mobile device transmit timing advance, angle of arrival delay spread characteristics, or other parameters.

In this algorithm, a mobile device at location L receives a radio signature $U_L$ consisting of signals from cellular base stations and WLAN ANs. Let V be the set of radio signatures for all stored reports at the collaboration server. Likewise, let:
G be the geographic area served by the collaboration server
m be the number of cellular base stations in G
n be the number of WLAN ANs in G
$U_L$ be the radio signature received by a device at location L
S be the RSS component of the radio signature $U_L$, in units of dB
$S_{Wi}$ be the RSS of the $i^{th}$ WLAN AN signal strength of S, where i=1 . . . n
$S_{Ci}$ be the RSS of the $i^{th}$ cellular base station signal strength of S, where i=1 . . . m
V be the set of all stored signatures at the collaboration server
R be the RSS component of the radio signature set V, in units of dB
$R_j$ be the jth RSS radio signature of the set R stored at the collaboration server
$R_{jWi}$ be the RSS of the $i^{th}$ WLAN AN signal strength of $R_j$, where i=1 . . . n
$R_{jCi}$=be the RSS of the $i^{th}$ cellular base station signal strength of $R_j$, where i=1 . . . m
Let $D(S, R_j)$ be the distance function between the RSS signatures S and $R_j$, and $$D(S, R_j) = \text{Sum}\left( |S_{Wi} - R_{jWi}|^r, \atop i=1..n \right.$$
$$\text{(if both } S_{Wi} \text{ and } R_{jWi} \text{ are present in the signatures } U_L \text{ and } R_j$$
$$\left. (0, \text{otherwise} \right.$$
$$+$$
$$c * \text{Sum}\left( |S_{Ci} - R_{jCi}|^r, \atop i=1..m \right.$$
$$\text{(if both } S_{Ci} \text{ and } R_{jCi} \text{ are present in the signatures } U_L \text{ and } R_j$$
$$\left. (0, \text{otherwise} \right.$$
$$(1)$$

Where:
r is a constant used to tune the matching algorithm performance and r=2 is a typical value used in this algorithm.

In this algorithm, the first summation term gives the (magnitude)$^r$ of the difference between S and $R_j$ of all the common WLAN AN signals between the two signatures. The second summation term gives the (magnitude)$^r$ of the difference between S and $R_j$ of all the common cellular base station signals between the two signatures. The constant c can be used to tune the relative weight of cellular signature component relative to the WLAN signature component.

When matching a received radio signature S against the stored signature set, the collaboration server computes the distance $D(S, R_j)$ over the set of all radio signature R in store. The collaboration server declares a match if:

$(D(S,R_j)/k^\alpha < T)$ AND $(k >= K)$

Where:
k is the number of non-zero components (i.e., common radio signals between the signatures) that makes up the distance function $D(S, R_j)$ in equation (1)
α is a parameter typically set to between 1 and 1.5 to give bias to signatures with larger number of common received radio signals,
T is a preset threshold of mean error,
K is preset minimum threshold number of common base station and AN signals between the radio signatures to qualify for a match.

An example for K and T may be K=2 and T=50 (dB$^2$). This example requires at least two common radio signals between S and $R_j$, and the mean square error over the non-zero components has to be less than 50 dB$^2$ to match the signature. Once the matching radio signatures are found, the collaboration server may choose to return the reports associated with the N best matched signatures. It will be appreciated that it may not be desirable or possible for the mobile device to include all available ANs in the radio signature. However, the various embodiments of the disclosure described in greater detail herein do not require that the radio signature includes all available ANs.

Figure 7:
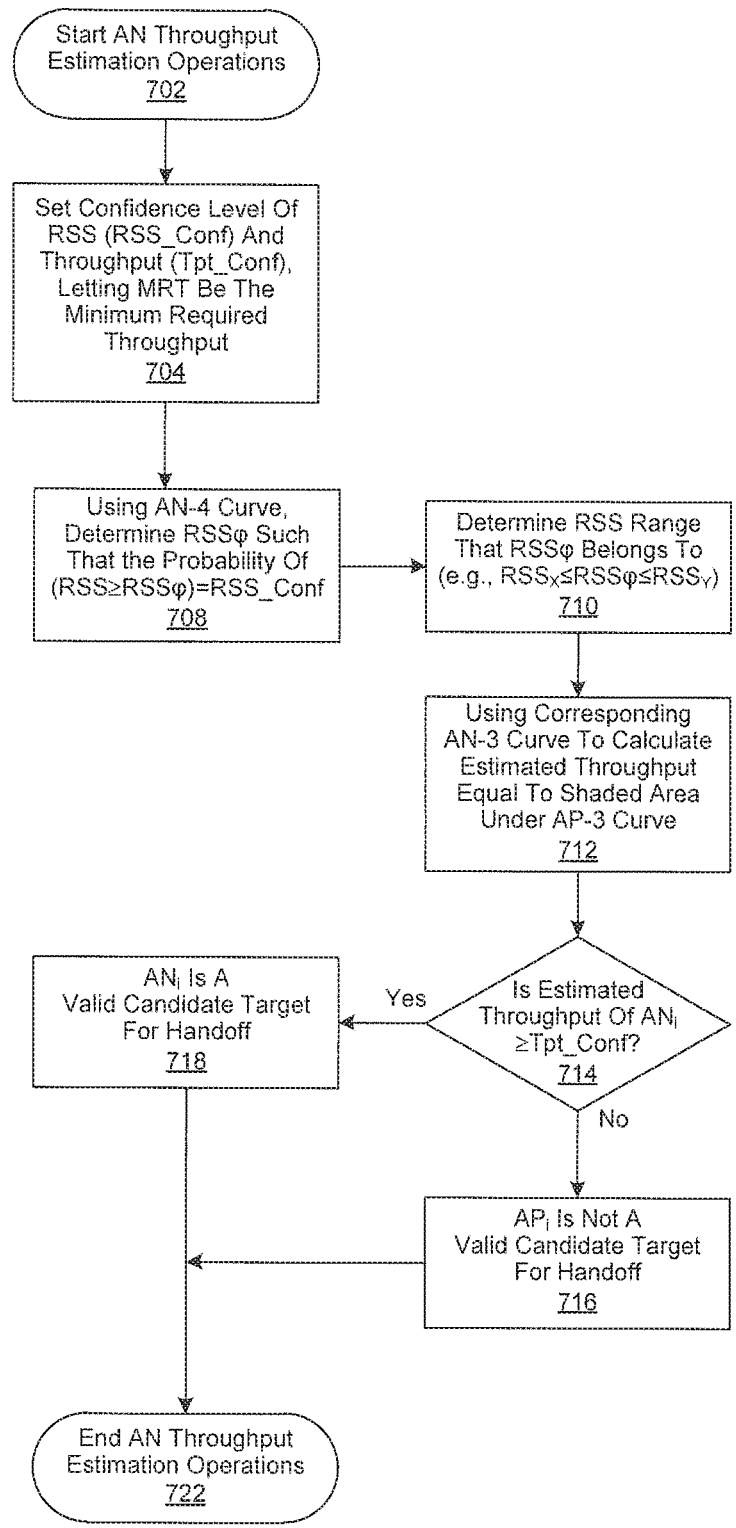
FIG. 7 is a flowchart of operations performed by a location-aware device to estimate the throughput of an AN for a given location and predefined chip set.

FIG. 7 is a flowchart of operations performed by a location-aware device in accordance with an embodiment of the disclosure to estimate the throughput of an ANi for a given location and predefined chip set. In this embodiment, AN throughput estimation selection operations are begun in step 702, followed by setting the confidence level of the received signal strength (RSS_Conf) and throughput (Tpt_Conf) in step 704, letting MRT be the minimum required throughput as described in greater detail herein. In step 708, the AN curve 'AN-4' is used, as likewise described in greater detail herein, to determine RSSφ, such that the probability of (RSS≥RSSφ)=RSS_Conf. The RSS range that RSSφ belongs to is determined in step 710 (e.g., $RSS_x \leq RSS\varphi \leq RSS_Y$), followed by using the corresponding AN-3 curve in step 712 to calculate estimated throughput equal to the shaded area under the AN-3 curve.

A determination is then made in step 714 whether the estimated throughput of $AN_i \geq$Tpt_Conf. If not, then $AN_i$ is determined in step 716 to not be a valid candidate target for handoff. Otherwise, then $AN_i$ is determined to be a valid candidate target for handoff in step 718. Once the validity of $AN_i$ as a candidate handoff target is determined in either step 716 or 718, then AN throughput estimation operations are ended in step 718.

Figure 8:
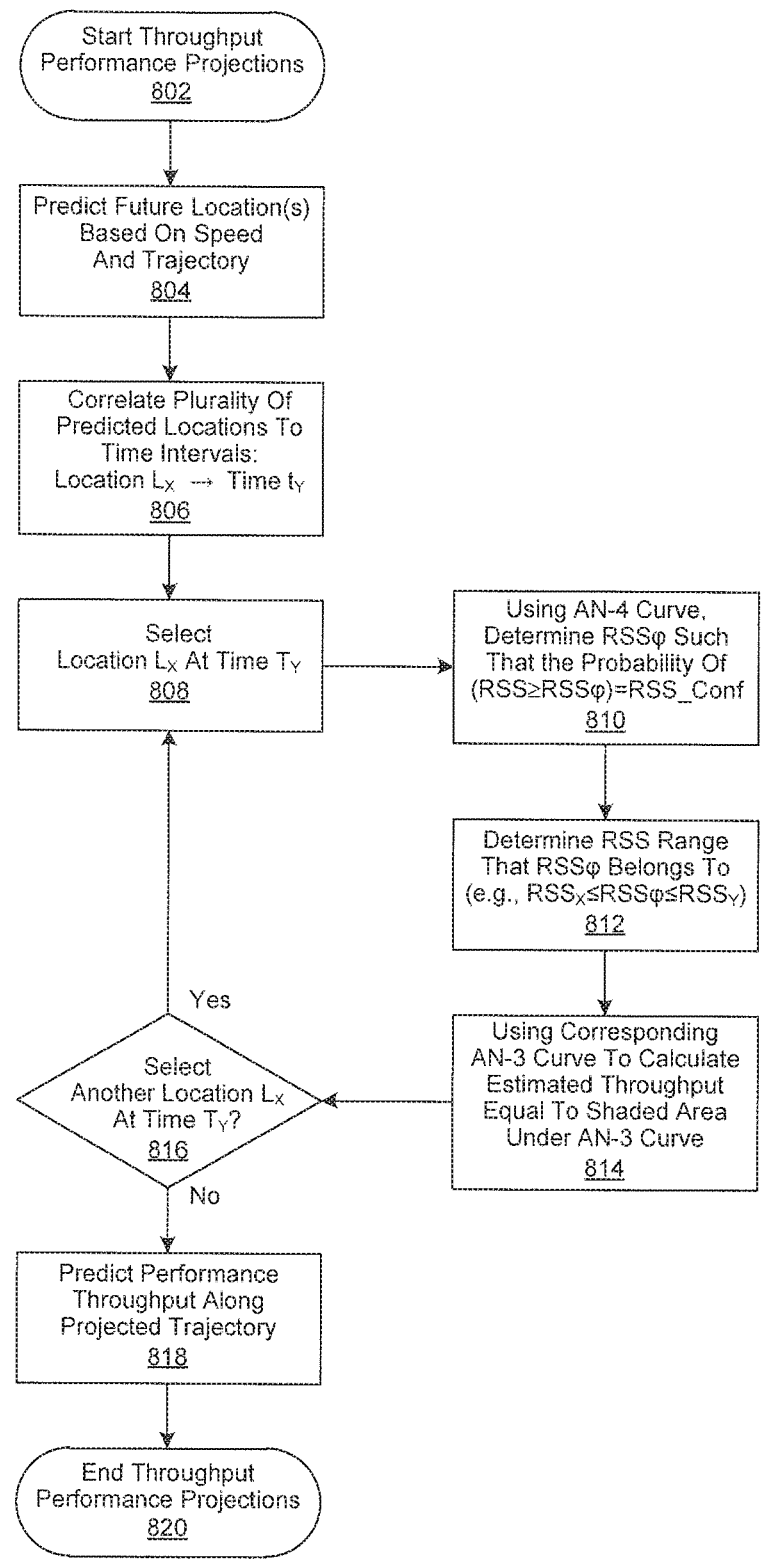
FIG. 8 is a flowchart of operations performed by a location-aware device to predict how throughput performance will evolve along its predicted trajectory.

FIG. 8 is a flowchart of operations performed by a location-aware device in accordance with an embodiment of the disclosure to predict how throughput performance will evolve along its predicted trajectory. In this embodiment, throughput performance projection operations are begun in step 802, followed by a location-aware device predicting its future location(s) in step 804, based on its speed and trajectory. Then, in step 806, a plurality of locations $L_X$ (e.g., $L_1, L_2 \ldots$) are correlated to a respective plurality of time intervals $T_Y$ (e.g., T1, Tt2 . . . ). A location $L_X$ is then selected with a corresponding time interval $T_Y$ is then selected in step 808. In step 810, the AN curve 'AN-4' is used, as likewise described in greater detail herein, to determine RSSφ, such that the probability of (RSS≥RSSφ=RSS_Conf. The RSS range that RSSφ belongs to is determined in step 812 (e.g., $RSS_x \leq RSS\varphi \leq RSS_Y$), followed by using the corresponding AN-3 curve in step 814 to calculate estimated throughput equal to the shaded area under the AN-3 curve.

A determination is then made in step 816 whether to select another location $L_X$ is then selected with a corresponding time interval $T_Y$. If so, the process is continued, proceeding with step 808. Otherwise, the mobile device uses the throughput values resulting from the operations performed in step 810 through 814 in step 818 to predict how throughput performance will evolve along its predicted trajectory. Throughput performance projection operations are then ended in step 820.

It will be appreciated that the disclosure makes no assumption regarding how the collaboration server system is physically implemented. For example, the collaboration server system can be distributed, centralized, etc. The collaboration server system may likewise be implemented as a collection of physical entities, which interact with each other through server-internal interfaces and protocols. Likewise, the collaboration server system can be separate from the Location-Based Data Server, e.g., ANDSF, but it could also be realized by enhancing the Location-Based Data Server system. Accordingly, as used herein, the aforementioned collaboration server system is referred to as a "server." It will likewise be appreciated that due to requirements such as scalability, load balancing, fault tolerance, the collaboration server may consist of a collection of physical entities, each with its own address. Likewise, the mobile device has to select or discover which entity to interact with. Accordingly, the address of the collaboration server can be determined in a variety of ways: static configuration, dynamic discovery (DNS, DHCP), etc. In particular, if the collaboration server is an enhanced ANDSF, the ANDSF discovery mechanism applies.

Those of skill in the art will recognize that there are three types of events which can have an impact on the interaction between the various mobile devices and the collaboration server: collection of data by the device, reporting of data by the device to the collaboration server, and subsequent distribution of the processed information. Regarding the collection of data, the triggers can be statically configured, dynamically downloaded from the collaboration server, or both. Likewise, the Location-Based Data Server mechanisms to download information from the network to the device can also be used. In various embodiments, data collection can be triggered when the data observed by the device differs significantly from the processed information provided by the collaboration server. For example, the device sees an AN which is not in the list from the collaboration server. In the ramp-up phase, the processed information will be essentially empty and therefore there will be significant discrepancies between the processed information and the observed data, which will trigger the data collection.

Regarding the reporting of data, the mobile device does not have to report the collected data in real time. Instead, it can defer the reporting until conditions are favorable, such as when its battery is at a good level, access to plentiful bandwidth is available, etc. Likewise, the triggers for reporting can be statically configured, dynamically downloaded from the collaboration server, or both. Alternatively, the Location-Based Data Server mechanisms to download information from the network to the device can also be used. Regarding distribution of processed information, the device can obtain the processed information in push mode or pull mode. Pull mode is initiated by the device and the trigger can likewise be statically configured, or dynamically downloaded from the collaboration server. If the mobile device is location-aware, it has the option to provide either location information or a radio signature to be used as an index key to retrieve the processed information. The mobile device may likewise anticipate its future locations and retrieve the processed information corresponding to these future locations ahead of time. The Location-Based Data Server mechanisms to download information from the network to the device can also be used. Push mode is initiated by the collaboration server upon some network triggers.

It will be appreciated that communication between the device and the collaboration server has to be secure to provide mutual authentication, encryption and integrity protection. Generic security schemes such as IPSec can be used. If the collaboration server is an enhanced ANDSF, then ANDSF security applies.

In view of the foregoing, skilled practitioners will realize that the disclosure offers various advantages. For example, the current ANDSF database requires management by the operator and has to be continuously updated as ANs are added and removed. In addition, the ANDSF database will not include Wi-Fi ANs that are not known to the operator. In contrast, the collaboration server database is automatically updated with the mobile devices' reports in various embodiments of the disclosure. Accordingly the need to manually update the database is alleviated or eliminated altogether, and the database includes all detected ANs, not just the ones known to the operator. Furthermore, the collaboration server can be used in conjunction with an ANDSF and the processed reports can be used to update the ANDSF. Moreover, the scheme can be used in an operator independent fashion, as an overlay, or can be implemented as an extension of an ANDSF. Additionally, the implementation of the described radio signature matching in various embodiments allows the disclosure to operate even when the mobile device cannot determine its location (e.g. the device is not GPS-equipped or is indoors).

Those of skill in the art will likewise realize that certain current approaches also rely on past device experience to optimize future behavior. However, there is no collaboration and sharing of information among the devices in such approaches. Instead, each device only has access to its own experience. In contrast, the sharing of information among the devices, as implemented in accordance with various embodiments of the disclosure, provides more sampling points and therefore a more robust, statistically reliable, and complete set of data. In particular, a mobile device roaming into a new area can benefit from the experience of other devices who have previously visited that area. One known approach proposes a collaboration method between devices, but the information exchanged is in real-time. However, unlike the present disclosure, there is no exchange of knowledge gathered from the devices accumulated over time. Furthermore, this approach introduces privacy issues, as the information is exchanged directly between the devices. In contrast, the consolidated information sent by the collaboration server in various embodiments of the disclosure is not subject to privacy issues. Furthermore, the present disclosure does not require the mobile device to send its reports to the collaboration server in real-time. Instead, reports can be sent when conditions are favorable, for example when bandwidth is cheap or plentiful, or the device's battery level is high.

Although the described exemplary embodiments disclosed herein are described with reference to offloading mobile data traffic to an alternative access network, the present disclosure is not necessarily limited to the example embodiments which illustrate inventive aspects of the present disclosure that are applicable to a wide variety of authentication algorithms. Thus, the particular embodiments disclosed above are illustrative only and should not be taken as limitations upon the present disclosure, as the disclosure may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the disclosure as defined by the appended claims so that those skilled in the art should understand that they can make various changes, substitutions and alterations without departing from the spirit and scope of the disclosure in its broadest form.

What is claimed is:

1. A method for operating a communication device, the method comprising:
generating a set of communication environment identification data corresponding to a location of the communication device, the set of communication environment identification data comprising a radio signature, wherein the radio signature comprises a combination of received radio signal attributes from one or more communication signals that are in range at the location of the communication device;
generating a set of observed communication performance data corresponding to the location of the communication device;
transmitting the set of communication environment identification data and the set of observed communication performance data to a server; and
receiving, from the server, a set of processed information items relevant to the set of communication environment identification data, wherein the processed information items indicate a plurality of access nodes available to the communication device and a plurality of attributes describing each of the access nodes available to the communication device, and wherein the plurality of attributes comprise at least one of a distribution of traffic flow from each of the access nodes during various times or a distribution of latency to establish a connection with each of the access nodes.

2. The method of claim 1, wherein the set of communication environment identification data further comprises:
location data corresponding to the location of the communication device; and
identification information corresponding to access nodes observed by the communication device.

3. The method of claim 2, wherein the set of communication environment identification data further comprises radio signature data.

4. The method of claim 1, wherein the received radio signal attributes includes radio characteristics comprising one or more of:
received signal strength;
radio mobile device transmit timing adjustment;
angle of arrival; or
multipath delay distribution.

5. The method of claim 1, wherein the set of observed communication performance data comprises at least one of:
a histogram of a received signal strength (RSS) for access nodes observed by a location-aware device;
a histogram of performance for access nodes observed by a location-aware device;
a histogram of performance for access nodes corresponding to a radio signature observed by a non-location-aware device;
an authentication scheme or subnet information used by an access node;
a histogram of the latency observed for connection to an access node; or
performance achieved using adaptive behavior communicating with an access node.

6. The method of claim 1, further comprising:
selecting an access node from the plurality of available access nodes based on the processed information items.

7. The method of claim 1, further comprising selecting an access node from the plurality of available access nodes for handoff based on the processed information items.

8. The method of claim 1, further comprising selecting an access node from the plurality of available access nodes during idle mobility based on the processed information items.

9. The method of claim 1, further comprising optimizing a set of access nodes communicating with the communication device based on the processed information items.

10. The method of claim 1, further comprising:
receiving, from the server, a set of location data meeting an accuracy requirement;
providing the set of location data to an external database;
receiving, from the external database, a set of access node attribute data; and
selecting an access node from the plurality of available access nodes based on the set of access node attribute data.

11. A communication device comprising:
a memory; and
a processor coupled to the memory, the processor configured to:
generate a set of communication environment identification data corresponding to a location of the communication device, the set of communication environment identification data comprising a radio signature, wherein the radio signature comprises a combination of received radio signal attributes from one or more communication signals that are in range at the location of the communication device;
generate a set of observed communication performance data corresponding to the location of the communication device;
transmit the set of communication environment identification data and the set of observed communication performance data to a server; and
receive, from the server, a set of processed information items relevant to the set of communication environment identification data, wherein the processed information items indicate a plurality of access nodes available to the communication device and a plurality of attributes describing each of the access nodes available to the communication device, and wherein the plurality of attributes comprise at least one of a distribution of traffic flow from each of the access nodes during various times or a distribution of latency to establish a connection with each of the access nodes.

12. The communication device of claim 11, wherein the set of communication environment identification data further comprises:
location data corresponding to the location of the communication device; and
identification information corresponding to access nodes observed by the communication device.

13. The communication device of claim 12, wherein the set of communication environment identification data further comprises radio signature data.

14. The communication device of claim 11, wherein the received radio signal attributes includes radio characteristics comprising one or more of:
- received signal strength;
- radio mobile device transmit timing adjustment;
- angle of arrival; or
- multipath delay distribution.

15. The communication device of claim 11, wherein the set of observed communication performance data comprises at least one of:
- a histogram of a received signal strength (RSS) for access nodes observed by a location-aware device;
- a histogram of performance for access nodes observed by a location-aware device;
- a histogram of performance for access nodes corresponding to a radio signature observed by a non-location-aware device;
- an authentication scheme or subnet information used by an access node;
- a histogram of the latency observed for connection to an access node; or
- performance achieved using adaptive behavior communicating with an access node.

16. The communication device of claim 11, wherein the processor is further configured to:
- select an access node from the plurality of available access nodes based on the processed information items.

17. The communication device of claim 11, wherein the processor is further configured to select an access node from the plurality of available access nodes for handoff based on the processed information items.

18. The communication device of claim 11, wherein the processor is further configured to select an access node from the plurality of available access nodes during idle mobility based on the processed information items.

19. The communication device of claim 11, wherein the processor is further configured to optimize a set of access nodes communicating with the communication device based on the processed information items.

20. The communication device of claim 11, wherein the processor is further configured to:
- receive, from the server, a set of location data meeting an accuracy requirement;
- provide the set of location data to an external database;
- receive, from the external database, a set of access node attribute data; and
- select an access node from the plurality of available access nodes based on the set of access node attribute data.

21. A non-transitory computer readable storage medium comprising instructions that when executed by a processor of a communication device cause the communication device to:
- generate a set of communication environment identification data corresponding to a location of the communication device, the set of communication environment identification data comprising a radio signature, wherein the radio signature comprises a combination of received radio signal attributes from one or more communication signals that are in range at the location of the communication device;
- generate a set of observed communication performance data corresponding to the location of the communication device;
- transmit the set of communication environment identification data and the set of observed communication performance data to a server; and
- receive, from the server, a set of processed information items relevant to the set of communication environment identification data, wherein the processed information items indicate a plurality of access nodes available to the communication device and a plurality of attributes describing each of the access nodes available to the communication device, and wherein the plurality of attributes comprise at least one of a distribution of traffic flow from each of the access nodes during various times or a distribution of latency to establish a connection with each of the access nodes.

* * * * *